Feb. 8, 1944.  L. HUNTER, JR  2,341,444
WHEEL BALANCING APPARATUS
Filed Sept. 20, 1941  2 Sheets-Sheet 1
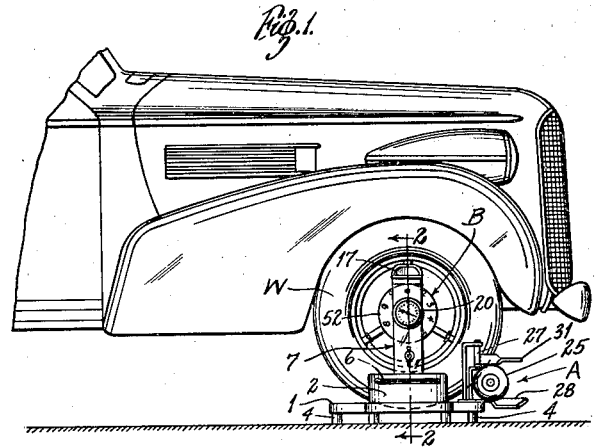
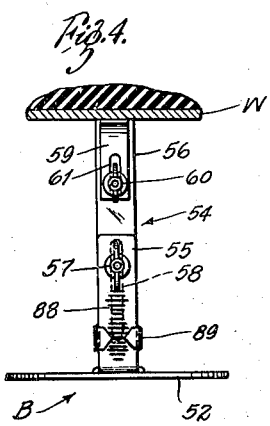
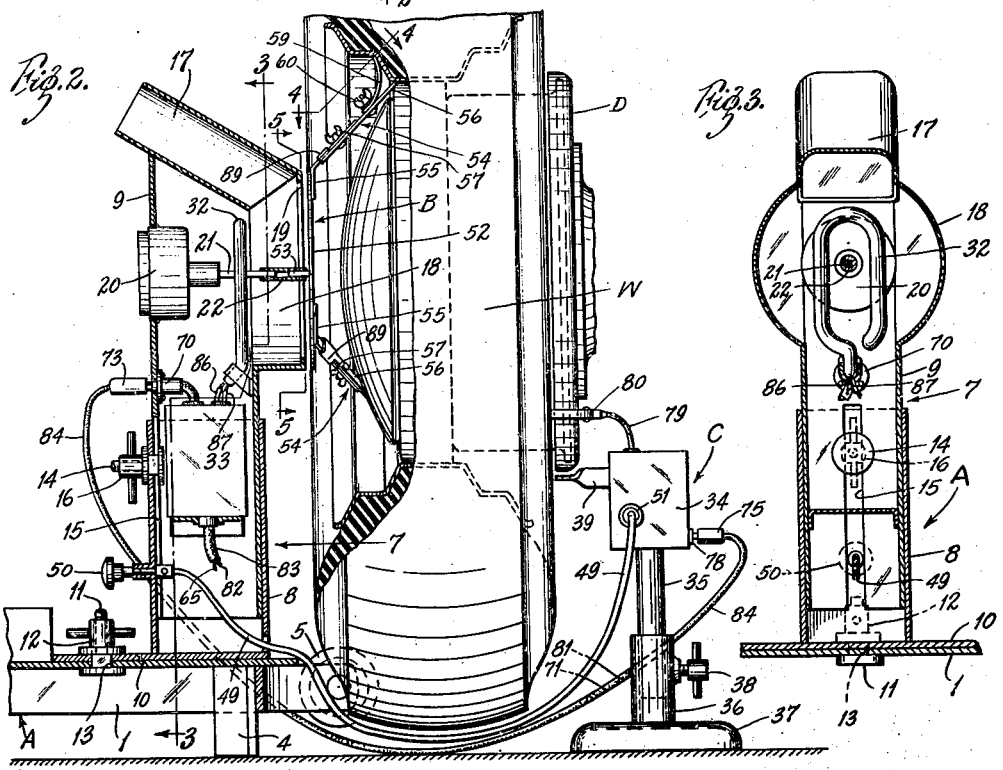
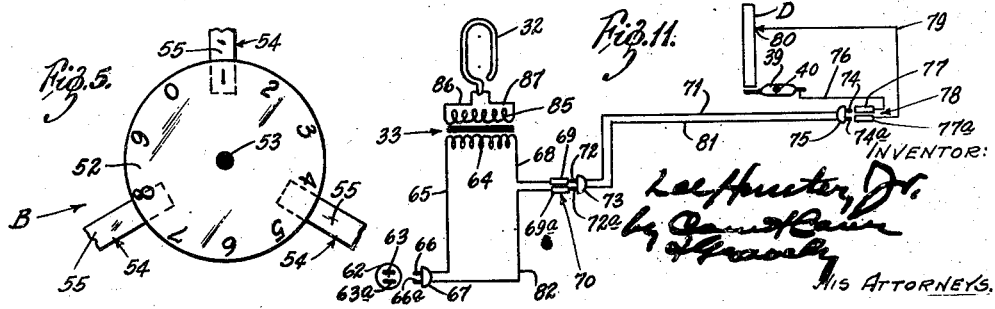
INVENTOR:
Lee Hunter, Jr.
His ATTORNEYS Feb. 8, 1944.   L. HUNTER, JR   2,341,444
WHEEL BALANCING APPARATUS
Filed Sept. 20, 1941   2 Sheets-Sheet 2
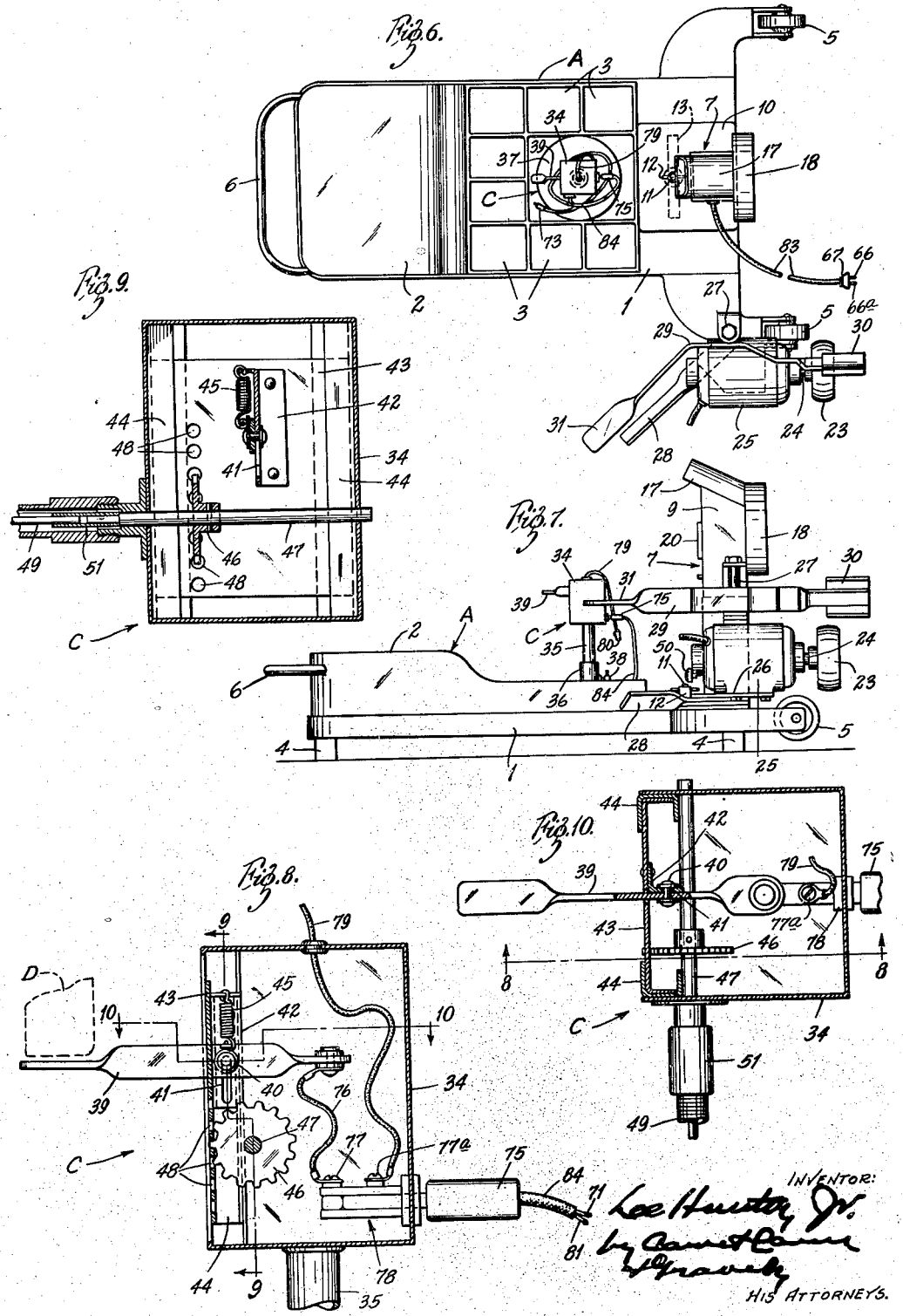

Patented Feb. 8, 1944

2,341,444

UNITED STATES PATENT OFFICE 2,341,444

WHEEL BALANCING APPARATUS

Lee Hunter, Jr., University City, Mo., assignor, by mesne assignments, to The Hartman Corporation of America, St. Louis, Mo., a corporation of Missouri Application September 20, 1941, Serial No. 411,613

7 Claims. (Cl. 73—53)

This invention relates to apparatuses for balancing rotary bodies, such as automobile wheels. The invention has for its principal objects to provide a simple and easily operable portable apparatus that will quickly and easily determine the standing or static and/or running or dynamic unbalance of the wheel and the location and the amount of counterbalancing weights required to correct such unbalance without dismounting the wheel from the automobile; that is readily adjustable for wheels of different diameters; that will provide a seat for the operator during the operation of determining and correcting the unbalance of the wheel and a handy compartment for the tools and counterbalancing weights required for such operation; that will provide for rotating the wheel; and that will indicate the speed of rotation of the wheel and provide a brake therefor. The invention consists in the wheel balancing apparatus and in the construction, combinations and arrangements of parts hereinafter described and claimed.

In the accompanying drawings, which form part of this specification and wherein like symbols refer to like parts wherever they occur, Fig. 1 is a side elevational view of the front portion of an automobile, showing my wheel balancing apparatus applied thereto, Fig. 2 is an enlarged vertical section on the line 2—2 in Fig. 1, Fig. 3 is a vertical transverse section on the line 3—3 in Fig. 2, Fig. 4 is an enlarged fragmentary section on the line 4—4 in Fig. 2, Fig. 5 is a fragmentary vertical transverse section on the line 5—5 in Fig. 2, Fig. 6 is a top plan view of the wheeled platform member, Fig. 7 is a side elevational view thereof, Fig. 8 is a vertical section on the line 8—8 in Fig. 10, Fig. 9 is a vertical section on the line 9—9 in Fig. 8, Fig. 10 is a horizontal section on the line 10—10 in Fig. 8, and Fig. 11 is a diagram illustrating the electric circuit for the lamp for illuminating the rotary indicator dial.

My wheel balancing apparatus comprises a carriage or truck unit A, an indicator unit B and a circuit closing unit C. The truck unit A comprises a main body portion or platform 1 having a seat 2 at the rear portion thereof for the operator, compartments 3 just forward of said seat for the tools and weights used in balancing the lifted automobile wheel W, and legs 4 for supporting said platform in horizontal or operative position. The platform 1 has suitable supporting rollers or casters 5 at the front corners thereof and a handle bar 6 at the rear end thereof, whereby the truck or carriage may be tilted by said handle on said rollers or casters and readily pushed or pulled from place to place.

Located at the forward end of the platform 1 of the truck unit A is a central, vertically adjustable hollow post or upright 7 comprising a tubular lower section 8 and a tubular upper section 9 that is vertically slidable in said lower section. The lower section 8 of the hollow post or upright 7 has a base flange 10 that seats on the platform 1 of the truck or carriage unit A and is secured thereto by a vertical bolt 11 that extends upwardly through registering openings provided thereon in said platform and base flange and has a nut 12 threaded on the upper end thereof for rigidly clamping said base flange to said platform. The bolt receiving opening in the platform 1 is preferably in the form of an elongated slot 13 that is disposed crosswise of said platform, thereby permitting horizontal adjustment of the post 7 transversely thereof. The adjustable upper section 9 of the post 7 is clamped in the desired position of vertical adjustment by means of a bolt 14 that extends through a vertically elongated slot 15 in the upper section and a horizontal hole in the lower section 8 and has a nut 16 threaded on the outer end thereof for clamping the two post sections together.

The upper section 9 of the telescopic post 7 terminates at its upper end in an observation tube 17 that inclines forwardly and downwardly from the rear wall of said section to the front wall thereof where it opens into the upper portion of a hollow outstanding circular boss 18 that is formed on said front wall and is provided with a relatively large central circular opening 19 adapted to be positioned adjacent to the outer face of the lifted wheel W substantially in axial alinement with the rotary axis thereof. The rear wall of the upper section 9 of the hollow post 7 has a speedometer 20 mounted therein in position to be observed by the operator when seated on the seat 2 of the platform 1. This speedometer has a flexible shaft 21 that is adapted to extend through the opening 19 in the boss 18 and terminates at its free end in a square socket drive coupling 22.

The platform 1 of the truck A is provided at one of its front corners with a driving roller 23 that is adapted to be engaged with the tread of the tire of the lifted wheel W that is to be balanced to thereby rotate said wheel on its axis. The drive roller 23 is fixed to the armature shaft 24 of an electric motor 25. The motor 25 is fixed to a horizontal supporting plate 26 that is pivotally mounted, as at 27, to the platform 1 for horizontal swinging movement towards and away from the longitudinal axis thereof, whereby said motor is adapted to be swung about the pivot 27 to move the driving roller 23 into and out of engagement with the tread of the raised wheel W of the automobile. The motor 25 is swung into and out of driving engagement with the wheel W by means of a pedal 28 fixed to the supporting plate 26 within easy reach of the right foot of the operator when seated on the seat. The platform is also provided with a brake comprising a lever 29 which is mounted just above the motor 25 for horizontal swinging movement about the pivot 27. The forward end of the lever 29 terminates in a brake shoe 30, and the rear end of said lever terminates in a pedal 31 adapted to be engaged by the operator to swing the brake shoe into engagement with the tread of the raised wheel W to stop the rotation thereof.

As shown in the drawings, the hollow post 7 has an electric lamp 32 mounted therein opposite the circular boss 18 in the front wall thereof. This electric lamp is preferably a gas or vapor lamp of the electric discharge type which requires a step-up transformer 33 for changing the ordinary low voltage service current to a current of sufficient high voltage to operate said lamp. The transformer is preferably located in the hollow post 7 just below the lamp 32 therein, said transformer and lamp being both secured to the upper post section 9 for movement therewith.

The circuit opening and closing unit C of the apparatus is preferably located adjacent to the inner face of the wheel W and comprises a housing 34 mounted on the upper end of a plunger 35 whose lower end is supported for vertically sliding movement in the upright socket 36 of a base member 37. The plunger 35 is clamped in the desired position of vertical adjustment in the socket 36 by means of a suitable clamp screw 38. A contact lever 39 is pivotally supported in the housing 34 for vertical swinging movement on a horizontal pivot pin 40 with one arm extending outside of said housing in position to cooperate with the underside of the brake housing plate D or any other stationary part of the automobile that will vibrate in response to any vibration, transmitted thereto by the unbalance of the rotating wheel W. The pivot pin 40 of the contact lever 39 is mounted in a vertical slot 41 in one flange of a vertically disposed angle shaped bracket 42 whose other flange is rigidly secured flatwise to one side face of a plate 43 that is mounted for vertical sliding movement in guideways 44 provided therefor in the housing 34. The pivot pin 40 is held in the upper end of the slot 41 in the bracket 42 by means of a coil tension spring 45 having one end anchored to said bracket and the other end anchored to the contact lever 39 immediately above said pin. The vertically slidable contact lever supporting plate 43 is raised and lowered to provide a fine vertical adjustment for the contact lever 39 by means of a pinion 46 fixed to a horizontal shaft 47 journaled in the housing 34 with the teeth of the pinion intermeshing with a series of vertically spaced holes 48 in said slide plate. The shaft 47 is manually rotated by the operator from the seat 2 on the platform 1 of the truck A of the apparatus by means of a flexible shaft 49. One end of this shaft is permanently journaled in the front wall of the lower section 8 of the hollow post 7 and is provided with an operating knob 50; and the other end of said flexible shaft terminates in a socket 51 adapted to be detachably connected to the shaft 47 to drive the same.

The indicator unit B comprises a circular disk or dial 52 which is circumferentially graduated, preferably by means of equally spaced numbers or other suitable indicia. This dial indicator 52 is adapted to be secured to the outside face of the hub portion of the wheel W that is to be balanced and has an axial pin 53 on the outer face thereof that is disposed in axial alinement with the wheel axis and is adapted to cooperate with the coupling member 22 on the free end of the flexible speedometer shaft 21 to drive the same when said wheel is rotated. The indicator dial has three equally spaced extensible arms 54 projecting radially therefrom into engagement with the small diameter of the rim of the wheel W. Each of these arms includes two sections 55 and 56 that are adustably secured together by a thumb screw 57 that extends through a hole in one section and an elongated slot 58 in the other section, thus making the arms adjustable in length to fit wheel rims of different diameters. The outermost section 56 of each of the arms 54 has a leaf spring member 59 secured thereto by means of a thumb screw 60, the outer end of this member being adapted to bear against the rim portion of a larger diameter of the wheel. The thumb screw 60 extends through a longitudinal slot 61 in the member 59 and a hole in the outer section 56 of the arm 54, whereby said member is adjustable lengthwise of said arm for wheel rims of different diameter and contour.

The transformer 33 is supplied with ordinary low voltage current from a service socket or outlet 62 through a low voltage circuit that leads from one of the contacts 63 of said service socket through the primary or low voltage winding 64 of said transformer, thence to the inner arm of the contact lever 39 in the housing 34 of current closing or circuit breaking unit C, thence through the stationary part D of the automobile chassis or frame and thence back to the other contact 63a of said service socket.

As shown in Fig. 11 of the accompanying drawings the low voltage or primary circuit of the transformer 33 comprises a wire 65 leading to one terminal of the primary winding 64 of said transformer from one contact 66 of a plug 67 adapted for connection with the service socket 62, a wire 68 leading from the other terminal of said winding to one contact 69 of the socket member 70 of a second plug switch, a wire 71 leading from one contact 72 of the plug element 73 of said second plug switch to one contact 74 of the plug member 75 of a third plug switch, and a wire 76 leading from one contact 77 of the socket member 78 of said third plug switch to the contact lever 39 which engages the stationary part D of the automobile. The primary circuit then leads from the stationary part D of the automobile to the other contact 77a of the socket member 78 of the third plug switch through a wire 79 having a contact 80 of the battery clip type for ready attachment to said part of said automobile, thence through a wire 81 leading from the other contact 74a of the plug member 75 of said third plug switch to the other contact 72a of the plug member 70 of the second plug switch, and thence through a wire 82 from the other contact 69a of the socket member 70 of said second plug switch to the other contact member 66a of the plug member 67 which is engaged with the outlet socket 62 of the first or service switch. For the sake of convenience in setting up the units A and C of the apparatus, the portions of the wires 65 and 82 located between the transformer 33 and plug member 67 that engages the service outlet 62 are encased in a cord 83. For the same reason, the socket member 70 is mounted in the hollow post 7, while the socket member 78 is mounted in the contact lever supporting housing 34 of the circuit breaking unit; and the wires leading to the plug members 73 and 75 which cooperate with the sockets 70 and 78, respectively, are encased in a separate cord 84.

The high voltage or secondary circuit comprises the high voltage or secondary winding 85 of the transformer 33, a wire 86 leading from one terminal of said secondary winding to one of the electrodes of the lamp and a wire 87 leading from the other electrode of the lamp to the other terminal of said secondary winding.

In the use of the above described apparatus in determining and correcting the unbalance of an automobile wheel, the wheel W is jacked up so as to freely rotate on its axis. The indicating disk 52 is then placed opposite the hub of the wheel and secured thereto in axial alinement with the rotary axis thereof by adjusting the extensible radial arms 54 of the disk and clamping said arms in such position by tightening the thumb screws 57 and 60. As an aid in centering the disk 52 on the lifted wheel W, the inner section 55 of each arm has a scale 88 thereon and the outer section having an indicator 89 fixed thereto for cooperation with said scale. The operator then grasps the handle bar 6 at the rear end of the truck unit A and rolls the truck on its rollers 5 toward the lifted wheel W until the post 7 is opposite the indicating disk 52 and the drive roller 23 and brake 30 are in position to be engaged with the tread of said wheel. The post 7 may then be adjusted vertically or horizontally to bring the opening in the post in the front wall thereof in axial alinement with the disk 52 and then locked in this position of adjustment by tightening the thumb nuts 12 and 16. The coupling 22 at the free end of the speedometer shaft 21 is then engaged with the axial spindle 53 of the disk 52 so as to be driven thereby.

The circuit closing unit C is then placed alongside the inner face of the wheel W and the housing 34 adjusted vertically to bring the exposed end of the contact lever 39 beneath the bottom of the stationary brake housing plate D and the wire 79 leading from the upper end of said housing connected to said plate by means of the clip 80. The apparatus is then connected to the ordinary 110 volt service current by inserting the plug 67 at the free end of the cord 83 into the service outlet or socket 62.

The seat 2 of the truck unit A is then occupied by the operator and the motor 25 started and the driving roller 23 engaged with the tread of the lifted wheel W by manipulating the pedal 28. The wheel is then rotated by the motor 25 at a fairly high speed, say about 1150 revolutions per minute, after which the driving roller 23 is disengaged from the wheel. When the wheel slows down to a speed of about 1100 revolutions per minute the knob 50 is manipulated by the operator to bring the exposed arm of the contact lever 39 of the unit C in close proximity to the stationary part D of the vehicle. If the wheel is unbalanced, the centrifugal force generated by the heavy side thereof at such relatively high speed will be greater than that generated by the lighter side diametrically opposite to it and the shaft or spindle of the rotating wheel will deflect toward the heavier side and thus cause part of the machine D to vibrate, whereby said part will engage said contact arm once during each revolution of the wheel and close the circuit of the electric lamp 32 located in the post 7 opposite the numbered disk 52 fixed to the rotating wheel. Each time the circuit is closed, the lamp will flash and illuminate the number on the portion of the rotating indicating disk that is directly opposite the lighted lamp, and this particular number is the only number observed by the operator through the observation tube 17 at the top of the post 7, the other numbers being in the dark as they pass said tube. Each time the light flashes it indicates that at that instant the heavy portion of the wheel is causing the vibrating part D of the machine to be displaced far enough to cause it to make contact with the contact lever 39. This indicates that the light spot of the wheel is located at a point diametrically opposite the number noted by the operator.

However, the angle of lag, that is the circumferential distance that the recorded vibrations of the part D lag behind the heavy spot of the rotating wheel, must be taken into consideration in correcting the unbalance of the wheel. This angle of lag varies according to the speed of rotation of the wheel, the weight and size thereof, the rotational motion of inertia and the resiliency and frequency of vibration of the wheel supporting shaft or spindle. For the wheel shown, it will be assumed that the angle of lag for a dynamically unbalanced wheel is 120 degrees at a speed of 1100 revolutions per minute. To determine the correct angle of lag, a small trial or finding weight (not shown) is secured to the outside face of the rim of the wheel at an angle of 120 degrees from the number noted on the disk 52 in the direction of rotation. The wheel is then again rotated in the manner hereinbefore described at a speed of 1100 revolutions per minute and the numbered disk observed through the eye or focusing tube 17. If the reading shifts in either direction to another number, this indicates that the assumed lag angle is incorrect and that the finder weight must be shifted in such direction. When the finder weight is in proper circumferential position on the wheel, the number originally noted will be observed through the tube 17 when the wheel is rotated at a speed of 1100 revolutions per minute. After the reading returns to the number originally noted, more weight is added to the wheel at the finder weight location until the light fails to flash when the wheel is rotated at a speed of 1100 revolutions per minute, thus indicating that the wheel is properly balanced.

If it is found, for example, that a 3½ ounce weight is not enough to balance the wheel and that a 4 ounce weight is too much to balance the wheel and that the reading shifts ninety degrees opposite to the direction of rotation, this indicates that the wheel is dynamically out of balance due to the fact that the heavy spot of the tire is on the inner side thereof. In such case, the 3½ ounce weight is shifted from the outside to the inside of the wheel. If the reading then returns to the number originally noted, thus indicating that the wheel still is not quite balanced, this unbalance is corrected by adding a little more weight to the weight location on the inside of the wheel.

When it is desired to determine and correct the unbalance of the rear wheels of an automobile, one of said wheels is jacked up so as to rotate freely and the other wheel is blocked and the wheel that is being tested is driven by the motor of the vehicle instead of the electric motor.

Obviously, the hereinbefore described apparatus admits of considerable modification without departing from the invention. Therefore, I do not wish to be limited to the precise construction and arrangements shown and described.

What I claim is:

1. An apparatus for determining the unbalance of a rotating wheel while on its normal axis of rotation comprising a circumferentially graduated dial adapted for attachment to said wheel centrally thereof for rotation therewith, an electric discharge lamp for illuminating said dial, a normally opened electric circuit for said lamp, means for closing said circuit in response to vibrations produced by the unbalance of the rotating wheel, an eye tube for focalizing an observer's vision on a limited area of the graduated portion of the rotating and illuminated dial, a speedometer adapted to be operatively connected to said dial to register the speed of rotation of said wheel, means for driving said wheel, a brake for said wheel, separate means for engaging said brake and wheel driving means with said wheel, and a single portable support for said lamp, eye tube, speedometer, wheel brake and wheel driving means.

2. An apparatus for determining the unbalance of a rotating automobile wheel while on its normal axis of rotation comprising a circumferentially graduated dial rotatable with said wheel, an electric discharge lamp for illuminating said dial, a normally opened electric circuit for said lamp, means for closing said circuit in response to vibrations produced by the unbalance of the rotating wheel, means for focalizing an observer's vision on a limited area of the graduated portion of the rotating and illuminated dial, a speedometer adapted to be operatively connected to said dial to register the speed of said wheel, means for driving said wheel, a brake, separate means for engaging said driving means and said brake with said wheel, a portable support for said lamp, focalizing means, speedometer, driving means and brake, and a seat on said portable support from which said speedometer may be observed and access may be had to said focalizing means and the means for engaging said driving means and said brake with said wheel.

3. An apparatus for determining the unbalance of a rotating automobile wheel while on its normal axis of rotation comprising a circumferentially graduated dial rotatable with said wheel, an electric discharge lamp for illuminating said dial, a normally open electric circuit for said lamp including a stationary part of said automobile, means for closing said circuit in response to vibrations of said stationary part produced by the unbalance of the rotating wheel, and means for focalizing an observer's vision on a limited area of the graduated portion of the rotating and illuminated dial, said circuit closing means including a contact arm located in said circuit in position to be engaged by said stationary part when the latter is vibrating to thereby close said circuit, and means for bodily adjusting said contact arm to vary the normal clearance space between the latter and said stationary part, said means comprising a slide member for supporting said arm for bodily movement towards and away from said stationary part, a pinion for actuating said slide member, and a flexible shaft for rotating said pinion.

4. An apparatus for determining the unbalance of a rotating automobile wheel while on its normal axis of rotation comprising a circumferentially graduated indicator dial adapted for attachment to said wheel centrally thereof for rotation therewith, a portable truck unit including an electric discharge lamp for illuminating said dial, a speedometer adapted to be operatively connected to said dial to indicate the speed of rotation of said wheel, an eye tube for focalizing an observer's vision on a limited area of the graduated portion of the rotating and illuminated dial, means for driving said wheel, a brake for said wheel and separate means for engaging said brake and wheel driving means with said wheel, said lamp, speedometer, eye tube, wheel driving means and brake being all included in said portable truck unit, an electric circuit for said lamp including a stationary part of the automobile and a portable normally open circuit closing unit adapted to be engaged and closed by vibrations produced in said stationary portion by the unbalance of the rotating wheel.

5. An apparatus for determining the unbalance of a rotating automobile wheel while on its normal axis of rotation comprising a circumferentially graduated indicator dial adapted for attachment to said wheel centrally thereof for rotation therewith, a portable truck unit including an electric discharge lamp for illuminating said dial, a speedometer adapted to be operatively connected to said dial to indicate the speed of rotation of said wheel, an eye tube for focalizing an observer's vision on a limited area of the graduated portion of the rotating and illuminated dial, means for driving said wheel, a brake for said wheel and separate means for engaging said brake and wheel driving means with said wheel, said lamp, speedometer, eye tube, wheel driving means, brake and engaging means for said wheel driving means and brake being all included in said portable truck unit, an electric circuit for said lamp including a stationary part of the automobile and a portable normally open circuit closing unit adapted to be closed by vibrations produced in said stationary part by the unbalance of the rotating wheel, said portable circuit closing unit having a contact adapted for attachment to said stationary part and a pivotally supported contact lever adapted to be engaged by said part when vibrated to thereby close said electric lamp circuit.

6. An apparatus for determining the unbalance of a rotating automobile wheel while on its normal axis of rotation comprising a circumferentially graduated indicator dial adapted for attachment to said wheel centrally thereof for rotation therewith, a portable truck unit including an electric discharge lamp for illuminating said dial, a speedometer adapted to be operatively connected to said dial to indicate the speed of rotation of said wheel, an eye tube for focalizing an observer's vision on a limited area of the graduated portion of the rotating and illuminated dial, means for driving said wheel, a brake for said wheel and separate means for engaging said brake and wheel driving means with said wheel, said lamp, speedometer, eye tube, wheel driving means, brake and engaging means for said wheel driving means and brake being all included in said portable truck unit, an electric circuit for said lamp including a stationary part of the automobile and a portable normally open circuit closing unit adapted to be closed by vibrations produced in said stationary part by the unbalance of the rotating wheel, said portable circuit having a contact adapted for attachment to said stationary part and a contact lever adapted to be engaged by said part when vibrated to thereby close said electric lamp circuit, and means for bodily adjusting said contact lever relative to said stationary part comprising a member slidably mounted in said circuit closing unit and pivotally supporting said contact lever, a pinion mounted in said circuit closing unit for actuating said slide member, and a flexible shaft having one end operatively connected to said pinion for rotating the same, the other end of said flexible shaft being supported in said truck unit and provided with a knob for manually rotating said shaft.

7. An apparatus for determining the unbalance of a rotating automobile wheel while on its normal axis of rotation comprising a circumferentially graduated indicator dial adapted for attachment to said wheel centrally thereof for rotation therewith, a portable truck unit including an electric discharge lamp for illuminating said dial, a speedometer adapted to be operatively connected to said dial to indicate the speed of rotation of said wheel, an eye tube for focalizing an observer's vision on a limited area of the graduated portion of the rotating and illuminated dial, means for driving said wheel, a brake for said wheel and separate means for engaging said brake and wheel driving means with said wheel, said lamp, speedometer, eye tube, wheel driving means, brake and engaging means for said wheel driving means and brake being all included in said portable truck unit, an electric circuit for said lamp including a stationary part of the automobile and a portable normally open circuit closing unit adapted to be closed by vibrations produced in said stationary portion by the unbalance of the rotating wheel, said portable circuit closing unit having a contact adapted for attachment to said stationary portion and a pivotally supported contact lever adapted to be engaged by said portion when vibrated to thereby close said electric lamp circuit, and means for bodily adjusting said contact lever relative to said stationary portion comprising a member slidably mounted in said circuit closing unit and pivotally supporting said contact lever, a pinion mounted in said circuit closing unit for actuating said slide member, a flexible shaft having one end operatively connected to said pinion for rotating the same, the other end of said flexible shaft being supported in said truck unit and provided with a knob for manually rotating said shaft, and a seat on said truck unit from which said speedometer may be observed and access may be had to said eye tube, said wheel driving means, said brake and said knob.

LEE HUNTER, Jr.